United States Patent
Shah et al.

(10) Patent No.: US 9,921,873 B2
(45) Date of Patent: Mar. 20, 2018

(54) CONTROLLING WORK DISTRIBUTION FOR PROCESSING TASKS

(75) Inventors: Lacky V. Shah, Los Altos Hills, CA (US); Karim M. Abdalla, Menlo Park, CA (US); Sean J. Treichler, Sunnyvale, CA (US); Abraham B. de Waal, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 207 days.

(21) Appl. No.: 13/363,350

(22) Filed: Jan. 31, 2012

(65) Prior Publication Data

US 2013/0198759 A1 Aug. 1, 2013

(51) Int. Cl.
G06F 9/46 (2006.01)
G06F 9/44 (2006.01)
G06F 9/48 (2006.01)
G06F 9/50 (2006.01)

(52) U.S. Cl.
CPC .......... *G06F 9/4881* (2013.01); *G06F 9/4806* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 7,526,634 B1* | 4/2009 | Duluk, Jr. | G06F 9/52 712/216 |
| 7,594,095 B1* | 9/2009 | Nordquist | G06F 9/4843 712/22 |
| 7,765,549 B1* | 7/2010 | Lauer | G06F 9/5005 707/705 |
| 7,861,060 B1* | 12/2010 | Nickolls | G06F 9/522 712/22 |
| 8,336,056 B1* | 12/2012 | Gadir | G06F 9/5027 718/100 |
| 2007/0022249 A1 | 1/2007 | Togawa et al. | |
| 2010/0325178 A1 | 12/2010 | Won et al. | |

FOREIGN PATENT DOCUMENTS

CN 101165655 A 4/2008
TW 200516492 5/2005

* cited by examiner

*Primary Examiner* — Lewis A Bullock, Jr.
*Assistant Examiner* — Melissa Alfred
(74) *Attorney, Agent, or Firm* — Artegis Law Group, LLP

(57) ABSTRACT

A technique for controlling the distribution of compute task processing in a multi-threaded system encodes each processing task as task metadata (TMD) stored in memory. The TMD includes work distribution parameters specifying how the processing task should be distributed for processing. Scheduling circuitry selects a task for execution when entries of a work queue for the task have been written. The work distribution parameters may define a number of work queue entries needed before a cooperative thread array" ("CTA") may be launched to process the work queue entries according to the compute task. The work distribution parameters may define a number of CTAs that are launched to process the same work queue entries. Finally, the work distribution parameters may define a step size that is used to update pointers to the work queue entries.

18 Claims, 7 Drawing Sheets

US 9,921,873 B2

CONTROLLING WORK DISTRIBUTION FOR PROCESSING TASKS

BACKGROUND OF THE INVENTION

Field of the Invention

The present invention generally relates to execution of compute tasks and more specifically to controlling the distribution of work for compute task processing in a multi-threaded system.

Description of the Related Art

Conventional execution of compute tasks in multiple processor systems involves configuring a set of processing elements to execute each compute task. In some cases, the set of processing elements may be time-sliced to switch between two or compute tasks. However, the set of processing elements executing a particular compute task executes that compute task from start to finish.

Accordingly, what is needed in the art is a system and method for controlling the distribution of work for compute task processing in a multi-threaded system.

SUMMARY OF THE INVENTION

A system and method controls the distribution of work for compute task processing in a multi-threaded system. Each processing task is encoded as task metadata (TMD) stored in memory. The TMD includes work distribution parameters specifying how the processing task should be distributed for processing. Scheduling circuitry selects a task for execution when entries of a work queue for the task have been written. The work distribution parameters may define a number of work queue entries needed before a cooperative thread array" ("CTA") may be launched to process the work queue entries according to the compute task. The work distribution parameters may define a number of CTAs that are launched to process the same work queue entries. Finally, the work distribution parameters may define a step size that is used to update pointers to the work queue entries.

Various embodiments of a method of the invention for controlling the distribution of work for task processing include reading work distribution parameters included in task metadata that defines a first processing task, where the work distribution parameters control the distribution of the work to compute thread arrays (CTAs) configured for execution by a streaming multiprocessor. An amount of the work is stored in entries in a first queue is determined based on the work distribution parameters. A set of CTAs is launched for execution by the streaming multiprocessor, based on the work distribution parameters, to process the amount of the work. A pointer to a first entry in the first queue to be processed by a next set of CTAs is updated based on the work distribution parameters.

Various embodiments of the invention include a system for controlling the distribution of work for task processing. The system comprises a memory that is configured to store task metadata that defines a first processing task and a first queue and a task/work unit. The task/work unit is configured to read work distribution parameters included in the task metadata, where the work distribution parameters control the distribution of the work to compute thread arrays (CTAs) configured for execution by a streaming multiprocessor. The task/work unit is also configured to determine that an amount of the work is stored in entries in the first queue based on the work distribution parameters, launch a set of CTAs for execution by the streaming multiprocessor, based on the work distribution parameters, to process the amount of the work, and update a pointer to a first entry in the first queue to be processed by a next set of CTAs based on the work distribution parameters The work distribution parameters enable each processing task to control the distribution of work to be processed. Each processing task may be executed independently with a first processing task dynamically generating work to be processed by a second processing task. The distribution of the work may be controlled in terms of how much data is needed before processing of that data is initiated, the number of CTAs that will process the data, and a step size that controls the specific entries of the work queue that are distributed to each CTA. The distribution mechanism may be used to control the distribution of work multi-threaded systems and in data flow networks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
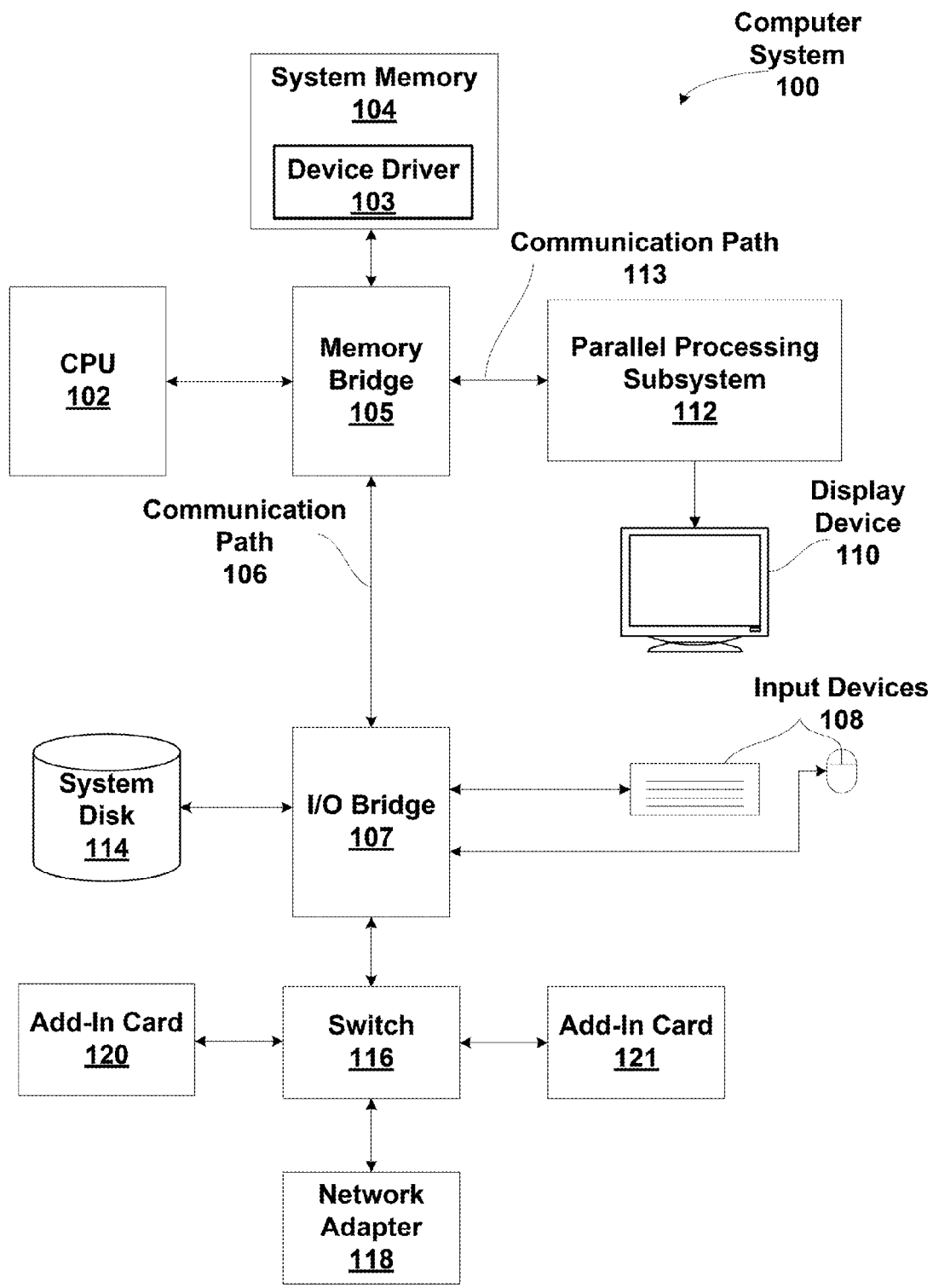
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
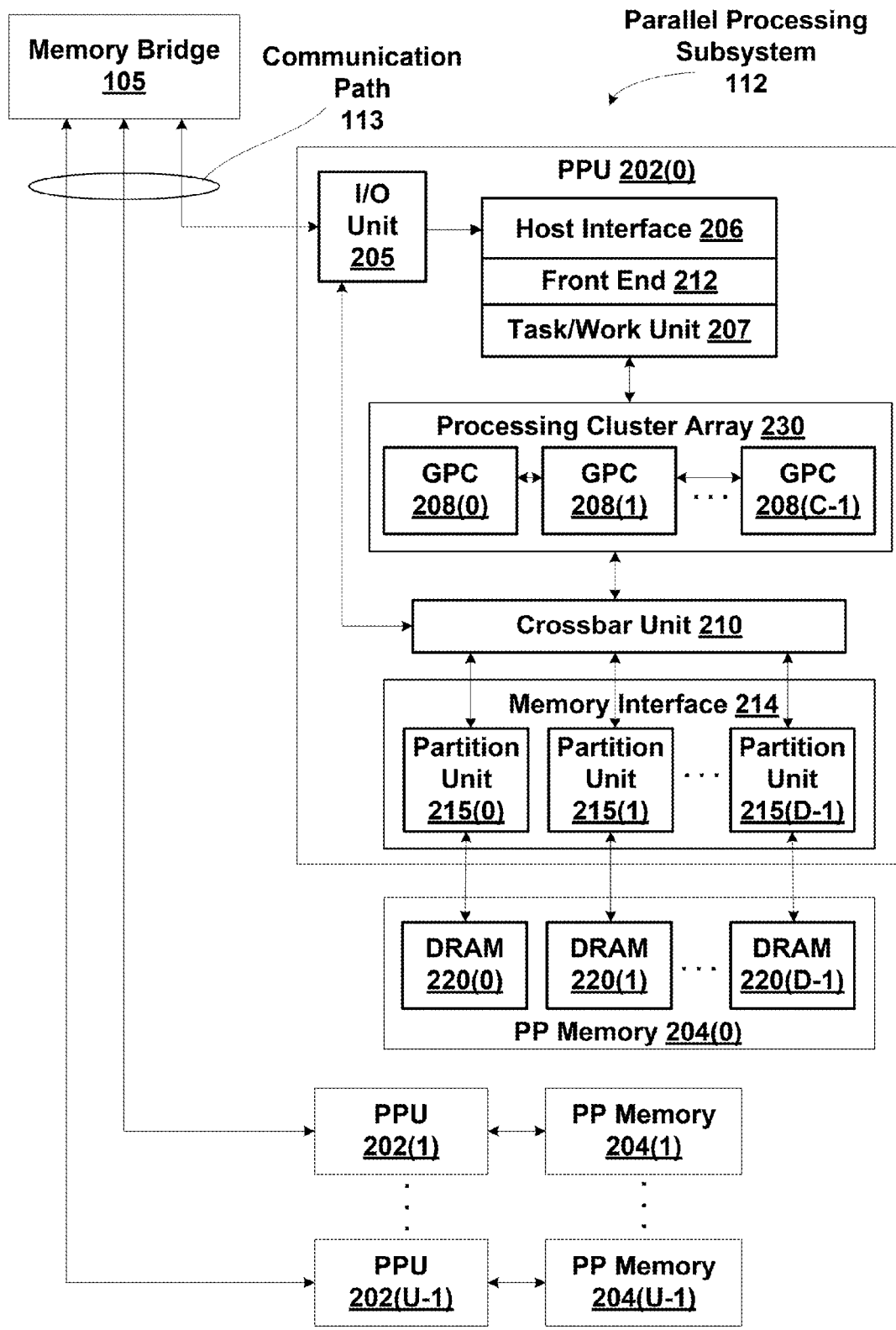
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks (task pointers) that are encoded as task metadata (TMD) and stored in memory. The task pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
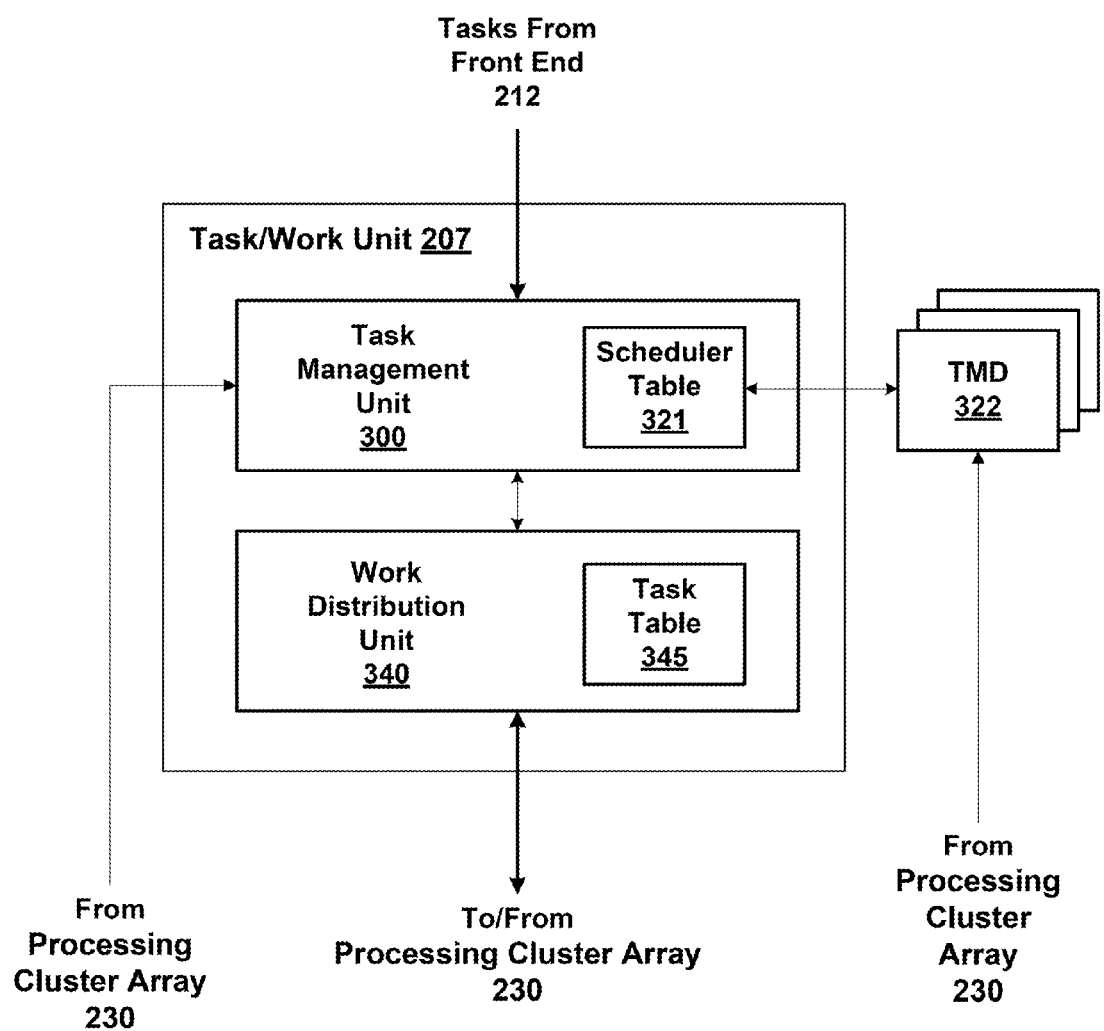
FIG. 3A is a block diagram of the Task/Work Unit of FIG. 2, according to one embodiment of the invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child task is added to a linked list in the scheduler table 321. A child task may be generated by a TMD 322 executing in the processing cluster array 230. A task is removed from a slot when the task is evicted.

Persons skilled in the art will understand that the architecture described in FIGS. 1, 2, and 3A in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Task Scheduling and Management

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each TMD in a linked list stores a pointer to the next TMD in the respective linked list. A head pointer and a tail pointer for the linked list are stored for each TMD. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the schedule table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the group in which the selected compute task is stored. Regardless of the scheduling technique, the task management unit 300 is able to quickly select a compute task by selecting the first entry in the linked list of the appropriate group. The compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority group that has at least one compute task, starting at the head of the group.

Each TMD 322 may be a large structure, e.g., 256 Bytes or more, that is typically stored in PP memory 204. Due to the large size, the TMDs 322 are expensive to access in terms of bandwidth. Therefore, the task/work unit 207 may be configured to include a cache (not shown) to store only the (relatively small) portion of the TMD 322 that is needed by the task management unit 300 for scheduling. The remainder of the TMD 322 may be fetched from PP memory 204 when the task is scheduled, i.e., transferred to the work distribution unit 340. The TMDs 322 are written under software control, and, when a compute task completes execution, the TMD associated with the completed compute task may be recycled to store information for a different compute task. Because a TMD 322 may be stored in the cache, the entries storing information for the completed compute task should be flushed from the TMD cache 405.

Task Processing Overview

Figure 3B:
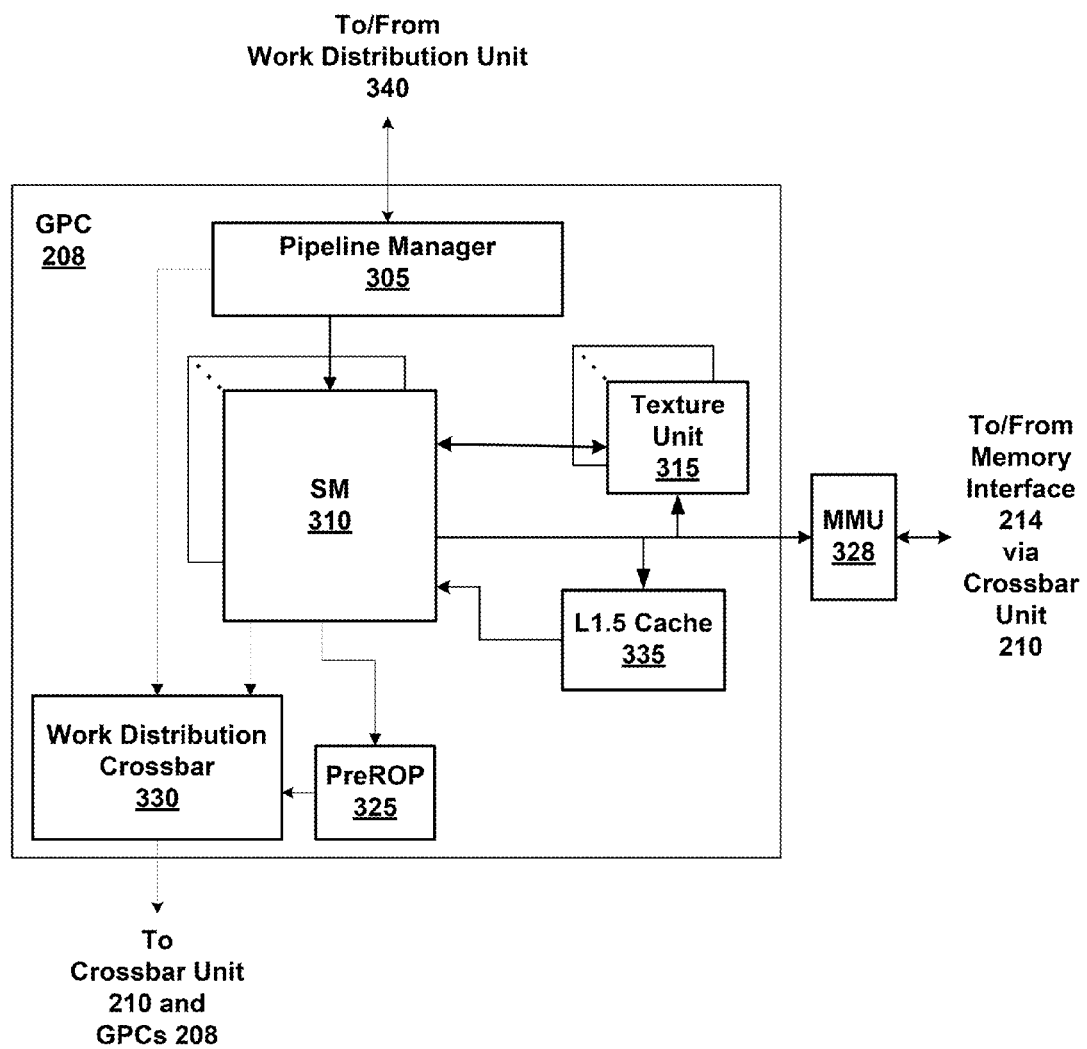
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Compute Task Metadata

Figure 4A:
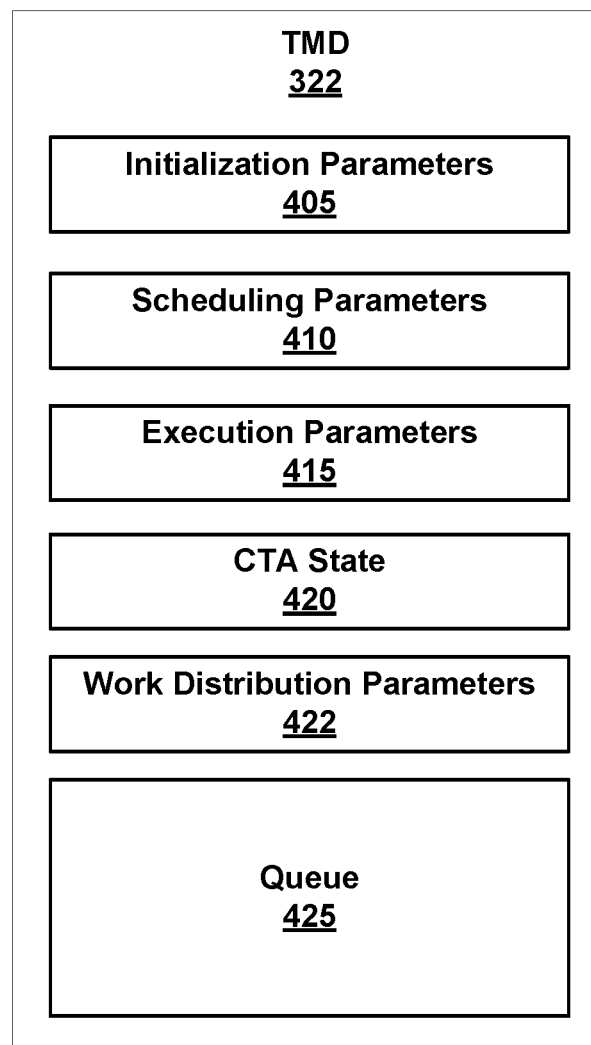
FIG. 4A is a conceptual diagram of the contents of a TMD of FIG. 3A, according to one embodiment of the invention.

FIG. 4A is a conceptual diagram of the contents of a TMD 322 that is stored in PP memory 204, according to one embodiment of the invention. The TMD 322 is configured to store initialization parameters 405, scheduling parameters 410, execution parameters 415, CTA state 420, work distribution parameters 422, and a queue 425. The work distribution parameters 422 store values that control the distribution of work stored in the queue 425 to one or more CTAs. State that is common to all TMDs 322 is not included in each TMD 322. Because a TMD 322 is a data structure that is stored in PP memory 204, a compute program running on the CPU 102 or PPU 112 can create a TMD 322 structure in memory and then submit the TMD 322 for execution by sending a task pointer to the TMD 322 to the task/work unit 207.

The initialization parameters 405 are used to configure the GPCs 208 when the TMD 322 is launched and may include the starting program address and size of the queue 525. Note that the queue 425 may be stored separately from the TMD 322 in memory, in which case the TMD 322 includes a pointer to the queue 425 (queue pointer) in place of the actual queue 425. When entries of the queue 425 are assigned to a CTA for processing, each entry is specified by an index or a virtual address.

The initialization parameters 405 may also include bits to indicate whether various caches, e.g., a texture header cache, a texture sampler cache, a texture data cache, data cache, constant cache, and the like, are invalidated when the TMD 322 is launched. Initialization parameters 405 may also include dimensions of a CTA in threads, a TMD version number, an instruction set version number, dimensions of a grid in terms of CTA width, height, and depth, memory bank mapping parameters, depth of a call stack as seen by an application program, and a size of the call-return stack for the TMD. The initialization parameters 505 may include constant buffer parameters, which are a set of descriptors of constant buffer data arrays stored in memory. Each descriptor has associated with it a descriptor id, a virtual address of the base of the constant buffer data array, a bit indicating that a constant buffer bind is valid, a bit indicating that the data from the constant buffer is invalidated in the cache before the TMD 322 is launched, and the size of the constant buffer data array. The constant buffer data may be accessed by the program being executed by any CTA launched from the TMD 322, using load constant instructions that specify the descriptor id and an offset within the array.

The execution parameters 415 for a TMD 322 may include a task pointer to a dependent TMD that is automatically launched when the TMD 322 completes. Semaphores may be executed by the TMDs 322 to ensure that dependencies between the different TMDs 322 and the CPU 102 are met. For example, the execution of a first TMD 322 may depend on a second TMD completing, so the second TMD generates a semaphore release, and the first TMD executes after the corresponding semaphore acquire succeeds. In some embodiments, the semaphore acquire is performed in the host interface 206 or the front end 212. The execution parameters 415 for a TMD 322 may store a plurality of semaphore releases, including the type of memory barrier, address of the semaphore data structure in memory, size of the semaphore data structure, payload, and enable, type, and format of a reduction operation. The data structure of the semaphore may be stored in the execution parameters 415 or may be stored outside of the TMD 322.

The execution parameters 415 may also include the starting address of the program to be executed for the TMD 322, the type of memory barrier operation that is performed when execution of the TMD 322 completes, a serial execution flag indicating whether only a single CTA is executed at a time (serially) for the TMD 322, and a throttle enable flag that controls whether or not the task/work unit 207 may limit the number of CTAs running concurrently based on the memory limitations specified for the TMD 322. The execution parameters 415 may also store various flags that control behaviors of arithmetic operations performed by the processing task that is executed for the TMD 322, e.g., not-a-number (NaN) handling, float-to-integer conversion, and rounding modes of various instructions.

The CTA state 420 for the TMD 322 may include the number of cycles that have elapsed since a CTA was launched for use in conjunction with the coalesce waiting time parameter. Additionally, when a process is preempted, processing of the TMD 322 may be stopped at an instruction boundary or a CTA boundary and identification of the CTA at which processing will be resumed is stored in the CTA state 420. The state information needed to resume execution of the TMD 322 after preemption may be stored in the CTA state 420, or in a separate area in PP memory 204, or in system memory 104. The CTA state 420 also stores pointers to entries of the queue 425 and counter overflow flags indicating when each pointer increments past the end of the queue 425 and needs to wrap back to the start of the queue 425.

The scheduling parameters 410 control how the task/work unit 207 schedules the TMD 322 for execution. The scheduling parameters 410 may include the TMD group ID, a bit to indicate where the TMD 322 is added to a linked list (head or tail), and a pointer to the next TMD 322 in the TMD group. The scheduling parameters 410 may also include masks that enable/disable specific streaming multiprocessors within the GPCs 208.

The scheduling parameters 410 may also include a bit indicating whether the TMD 322 is a queue TMD or a grid TMD. Alternate embodiments may have different structures for a grid TMD and a queue TMD, or implement either grid TMDs or queue TMDs. If the TMD 322 is a grid TMD, then the queue feature of the TMD 322 is unused, and execution of the TMD 322 causes a fixed number of CTAs to be launched and executed. The number of CTAs is specified as the product of the grid width, height, and depth. When entries of the grid are assigned to a CTA for processing, each entry is specified by coordinates within the grid, but there is no explicit data pointer. The program defined by the TMD 322 may use any sequence of instructions and constant buffer data values to convert the grid coordinates into a pointer to a fixed amount of predefined data for the grid to be processed by a CTA.

If the TMD 322 is a queue TMD, then the queue feature of the TMD 322 is used, meaning that data are stored in the queue 425, as queue entries. Queue entries are input data to CTAs of the TMD 322. The queue entries may also represent child tasks that are generated by another TMD 322 during execution of a thread, thereby providing nested parallelism. Typically, execution of the thread, or CTA that includes the thread, is suspended until execution of the child task completes. The queue 425 may be implemented as a circular queue so that the total amount of data is not limited to the size of the queue 425. As previously described, the queue 425 may be stored separately from the TMD 322 and the TMD 322 may store a queue pointer to the queue 425. Advantageously, queue entries for the child task may be written to the queue 425 while the TMD 322 representing the child task is executing.

In one embodiment, a variable number of CTAs are executed for a queue TMD, where a CTA is launched for each a number of contiguous entries written to the queue 425 of the queue TMD. While a particular CTA may process multiple contiguous entries of the queue 425, each entry in the queue 425 is processed by only a single CTA. The work distribution parameters 422 for a queue TMD may include the number of contiguous entries (N) of queue 425 that are needed to launch a CTA. The number of CTAs depends on the number of entries written to the queue 425 of the queue TMD and N. For example, when N=10 and 50 entries are written to the queue 425, 5 CTAs will be executed for the queue TMD. If all 50 entries are written at the same time, all 5 CTAs may launch at the same time. If the 50 entries are written over several clock cycles, then the CTAs will be launched as each successive group of 10 contiguous entries is written.

In another embodiment, each of the N entries may be processed more than one CTA. When N entries are added to the queue 425, a first set of CTAs are launched for the TMD 322, where the number of CTAs in the set, M, is also specified by the work distribution parameters 422. For example, when N=6 and M=3 and 36 entries are written to the queue 425, 18 CTAs (M*36/N) will be executed for the queue TMD. If all 36 entries are written at the same time, all 18 CTAs may launch at the same time. If the 36 entries are written over several clock cycles, then the CTAs will be launched as each successive group of 6 contiguous entries is written.

An example TMD 322 may be configured to perform tessellation operations, where each of the M CTAs processes vertices that are written to the queue 425. Each CTA may be configured to process the same set of vertices differently based on the CTA identifier. Multiple CTAs may be used to process each data element, e.g., entry written to the queue 425, when the amount of processing will benefit from concurrency. Note that in an embodiment where each CTA executes on a single SM 310, launching M CTAs to process N data elements will allow the data elements to be processed by up to M SMs 310 (assuming M is not greater than the number of SMs 310). When the processing speed of a CTA is limited by the resources of an SM 310, multiple CTAs may be used that each process fewer threads, so that more resources are available for each thread. In another example, when threads are likely to diverge during execution, each thread (or a set of threads) may be executed by a different CTA so that serialization of execution due to divergence is reduced and the divergent threads are instead executed concurrently by each of M different CTAs.

The work distribution parameters 422 may also include a step size, S that specifies the increment amount for updating the read pointer for the queue 425. When S equals N, each of the N entries is processed by M CTAs. When S is less than N, at least some of the N entries are processed by more than M CTAs, as described in conjunction with FIG. 4B. For example, a number of entries, N may be set to the number of vertices in each graphics primitive, e.g., three for triangles or four for polygons. The step size, S may be set to one for triangles and two for polygons to process a triangle strip or a polygon mesh where each new vertex (after the vertices defining the first graphics primitive) defines a new triangle or polygon.

Figure 4B:
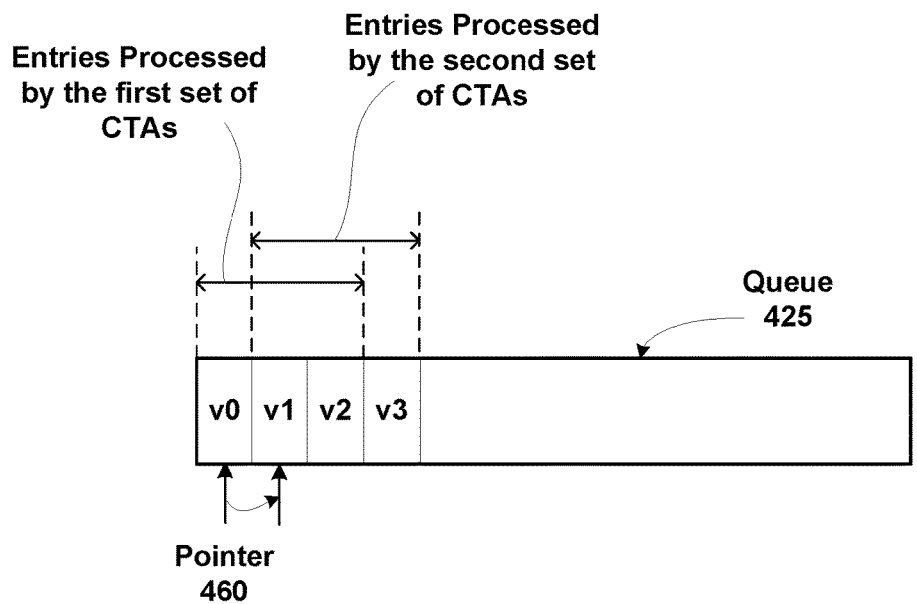
FIG. 4B illustrates entries of the queue of FIG. 4A, according to one embodiment of the invention.

FIG. 4B illustrates entries of the queue 425 of FIG. 4A, according to one embodiment of the invention. A first set of M CTAs is launched when the first three vertices (v0, v1, and v2) are written to the queue 425 (for N=3) and a pointer 460 that points to the first entry in the queue 425 to be included in the N entries for the next CTA launch is incremented by one to point to the entry storing v1. When another vertex, v3 is written to the queue 425, a second set of M CTAs is launched to process a second graphics primitive formed by three vertices (v1, v2, and v3).

The task/work unit 207 may construct a directed graph of processes, such as a dataflow network, where each process (or computation node) is a queue TMD 322. One or more producer TMDs 322 generate the initial inputs that are consumed by other TMDs 322. The distribution of the work to be processed by each TMD 322 may be controlled using the work distribution parameters 422.

Figure 4C:
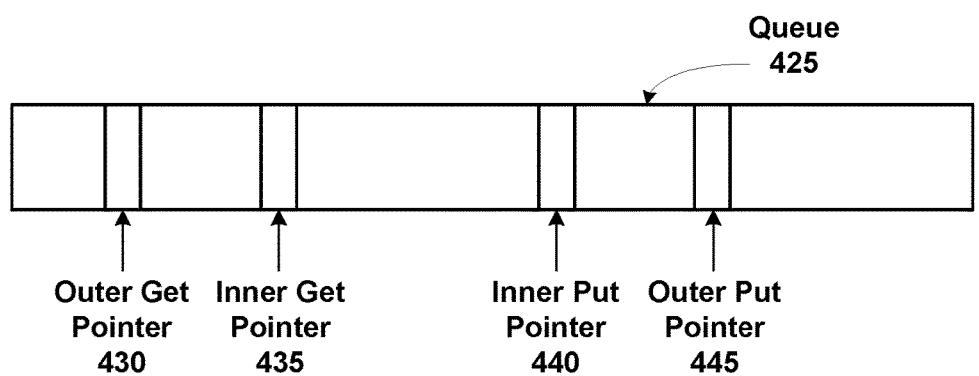
FIG. 4C illustrates pointers to entries of the queue of FIG. 4A, according to one embodiment of the invention.

FIG. 4C illustrates data pointers to entries of the queue 425 of FIG. 4A, according to one embodiment of the invention. Writing data or other information for a processing task encoded in the queue 425 is decoupled from the allocation of entries in the queue 425. First a process reserves or allocates a number of entries in the queue 425 and later, the process stores the data to be processed by the CTAs in the entries. The process may be producer TMD 322 that generates work to be processed by a consumer TMD 322 corresponding to the queue 425 that is written by the producer TMD 322. An outer put pointer 445 points to the next available entry in the queue 425 to be allocated and an inner put pointer 440 points to the oldest entry in the queue 425 that has been allocated and not yet written. The entries are not necessarily written in the order in which the entries are allocated, so there may be entries between the inner put pointer 440 and the outer put pointer 545 that have been written.

An outer get pointer 430 points to the oldest entry of the queue 425 that stores data that has been assigned to a CTA for processing, i.e., a CTA that will process the data has been launched but the CTA has not read the data yet. An inner get pointer 435 points to the newest entry of the queue 425 that has been assigned to a CTA for processing. The step size, S included in the work distribution parameters 422 is used to increment the inner get pointer 435 (or pointer 460 of FIG. 4B) when the M CTAs are launched by the task management unit 300. Data that have been written to the queue 525, but not yet assigned to a CTA for processing are stored in the entries between the inner get pointer 435 and the inner put pointer 440. Data that have been assigned to a CTA for processing and not read are stored between the outer get pointer 430 and the inner get pointer 435.

Task Work Distribution

Referring back to FIG. 4A, the scheduling parameters 410 of a queue TMD may also comprise a coalesce waiting time parameter that sets the amount of time that the task management unit 300 will wait before a CTA is scheduled with less than N queue entries. A launch of one or more CTAs with fewer than N queue entries is referred to as a partial launch. The coalesce waiting time parameter is needed when the queue is almost empty, but an insufficient number of queue entries is present, such as when the last graphics primitive is degenerate. The coalesce waiting time parameter is also needed for the case of producer-consumer queues, in order to avoid deadlock.

The task/work unit 207 may be configured to realign the queue entry reads of the queue 425 following a partial launch. Realignment may be an operating mode that is enabled via work distribution parameter specified in the TMD 322. Assuming realignment is enabled, whenever a partial launch occurs an alignment parameter, P, is updated that tracks the number of entries of the queue 425 accumulated in one or more sequential partial launches. P is incremented for each partial launch by the number of entries included in the partial launch, and when P equals N, the read accesses are realigned and P is reset to zero. When P equals zero, the task/work unit 207 will schedule one or more CTAs with N queue entries (assuming a coalesce waiting time does not expire). Note, that the task/work unit 207 is configured so that if a partial launch would cause P to be greater than N, the number of entries in the partial launch is reduced so that P will equal N.

Essentially, the task/work unit 207 attempts to align the outer get pointer 430 with an access boundary of the memory storing the queue 425 by issuing one or more partial launches to realign the first entry of the queue 425 for a next CTA launch. One reason realignment is desirable is the performance of memory accesses to read the N entries of the queue 425 may be maximized when the access is aligned to a memory boundary, such as a cache line. Reading a single cache line to obtain the N entries may be faster than reading two cache lines to obtain the N entries. For example, when the memory address of the first entry that is read from the queue 425 is a multiple of N (or S) the memory access may be aligned as a result of how the memory subsystem is implemented.

In one embodiment, the step size S may be affected when a partial launch occurs where the number of entries included in the partial launch is less than S and is set to S equal the number of entries included in the partial launch. For example, if N=10, S=5 and there are 6 entries in the queue 425 when a partial launch occurs one CTA is launched with the 6 entries and the pointer 460 (or the inner get pointer 435 shown in FIG. 4C) that points to the first entry in the queue 425 to be included in the N entries for the next CTA launch is incremented by S (5). After the partial launch, 1 of the 6 entries remains in the queue 425. Another partial launch occurs and another CTA is launched with the 1 entry and S is set to 1, so that the pointer 460 is incremented by 1. In another example, N=10 and S=5 and there are 4 entries in the queue 425 when a partial launch occurs. One CTA is launched with the 4 entries and S is set to 4 so that the pointer 460 is incremented by 4 instead of 5.

Modifying S when a partial launch occurs may be an operating mode (partial step size mode) that is enabled via a work distribution parameter specified in the TMD 322. Since it is possible to launch a set of CTAs with less than N entries in the queue, the actual number of valid data elements associated with a particular set of CTAs is made available to the CTA program to query via a special register.

Figure 5:
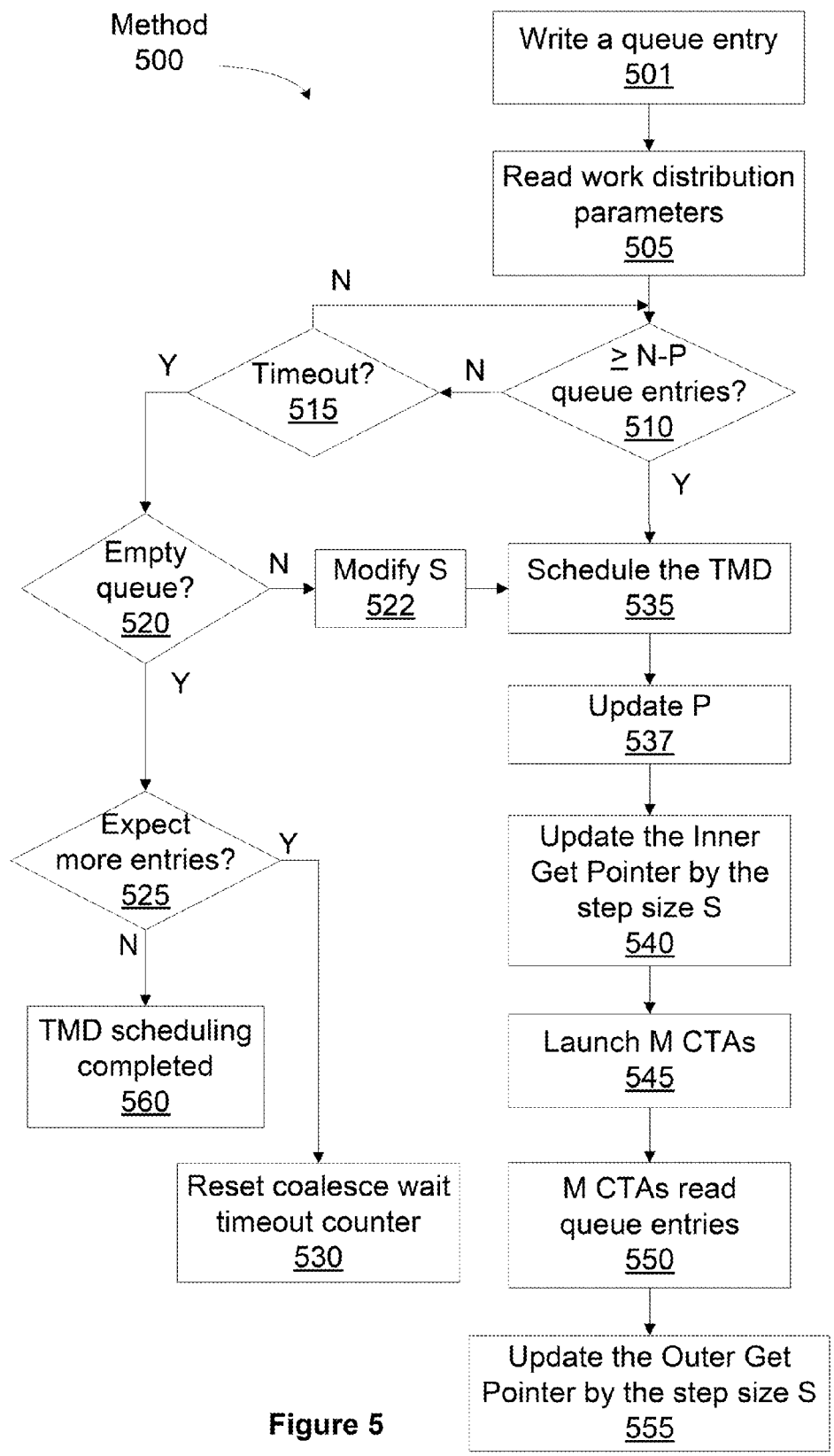
FIG. 5 illustrates a method for controlling the distribution of work for task processing, according to one embodiment of the invention.

FIG. 5 illustrates a method 500 for controlling the distribution of work for task processing, according to one embodiment of the invention. Although the method steps are described in conjunction with the systems of FIGS. 1, 2, 3A, 3B, 4A, 4B, and 4C, persons skilled in the art will understand that any system configured to perform the method steps, in any order, is within the scope of the invention.

At step 501 at least one entry of the queue 425 for a queue TMD 322 is written. At step 505 the work distribution parameters 422 for a queue TMD 322 are read. The work distribution parameters include N, M, and S. At step 510, the task/work unit 207 determines whether enough entries in queue 425 have been written to launch a set of M CTAs, i.e., if N−P or more entries are available in the queue 425. If, at step 510 the task/work unit 207 determines that less than N−P entries are available in the queue 425, then the task/work unit 207 proceeds to step 515 and determines if the coalesce wait time has elapsed. If at step 515 the task/work unit 207 determines that the coalesce wait time has not elapsed, then the task/work unit 207 waits for more entries to be written to the queue 425 and returns to step 510.

Entries may be written to the queue 425 after the TMD 322 is allocated and additional entries may be written to the queue 425 as CTAs are executed for the TMD 322. When the queue 425 is a circular queue, entries that have been read by a CTA may be overwritten with additional queue entries by another TMD 322 or by the CPU 102 via the front end 212. Writing of the queue 425 is decoupled from reading of the queue 425 by the CTAs, and may occur simultaneously with the reading. Therefore, the method 500 is performed whenever an entry of the queue 425 is written for a queue TMD 322.

If, at step 515, the task/work unit 207 determines that the coalesce wait time has elapsed, then at step 520, the task/work unit 207 determines if the queue 425 is empty. If the queue 425 is not empty, then the task/work unit 207 will launch a partial CTA. At step 522 the task/work unit 207 may be configured to modify S based on an operating mode (partial step size mode) and store the actual number of valid data elements included in the partial launch in the special register.

At step 535 the task/work unit 207 schedules a (partial or full) launch of the TMD 322 to process less than N−P entries that are available in queue 425. At step 537 P is updated by incrementing P by the number of queue entries included in the partial launch and then resetting P to zero if P equals N. Updating P for each partial launch of the TMD 322 realigns accesses of the entries in the queue 425 with memory or cache line boundaries for more efficient memory reads. Otherwise, when the queue 425 is empty, at step 525, the task/work unit 207 determines if more entries of the queue 425 are expected to be written. If, at step 525, the task/work unit 207 determines that no more entries of the queue 425 will be written for the TMD 322, then at step 560 scheduling of the TMD 322 is complete.

If, at step 525, the task/work unit 207 determines that at least one more entry of the queue 425 will be written for the TMD 322, then at step 530 the task/work unit 207 resets the coalesce wait timeout counter for the TMD 322. When an entry of the queue 425 is written, the task/work unit 207 will resume the method 500 at step 501. If at step 510, the task/work unit 207 determines that at least N entries are available in queue 425 to launch a set of M CTAs, then at step 535 the task/work unit 207 schedules the TMD 322 for execution to process the N entries by a set of M CTAs.

At step 540 the task/work unit 207 updates the inner get pointer 435 by the step size S. The inner get pointer 435 points to the first entry in the queue 425 to be included in the N entries for the next CTA launch. At step 545 the task/work unit 207 launches M CTAs to process the N (or fewer for a partial launch) entries of the queue 425. At step 550 the M CTAs read the N (or fewer) entries of the queue 425. At step 555 the task/work unit 207 updates the outer get pointer 430 by the step size S.

The work distribution parameters 422 are configured to control the distribution of work for processing according to a compute task that is executed in a multi-threaded system, e.g., PPU 202. The TMD 322 that encodes a compute task includes the work distribution parameters 422 and scheduling circuitry reads the work distribution parameters 422 when one or more entries of a work queue 425 for the compute task have been written. Multiple processing tasks may each be executed independently with a producer processing task dynamically generating work to be processed by a one or more consumer processing tasks. The distribution of the work to one or more consumer processing tasks may be controlled in terms of how much work is needed before processing of that work is initiated by the consumer processing tasks, the number of CTAs that will process the work, and a step size that controls the specific entries of the work queue that are distributed to each CTA. The distribution mechanism may be used to control the distribution of work multi-threaded systems and in data flow networks.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of controlling the distribution of work for task processing, the method comprising:
    determining a number of entries stored in a first queue, wherein the first queue is stored within a task metadata structure;
    reading work distribution parameters encapsulated in the task metadata structure that define a first processing task, wherein a first parameter included in the work distribution parameters specifies a number of entries (N) needed to launch a set of compute thread arrays (CTAs) for execution by a streaming multiprocessor, and a second parameter included in the work distribution parameters specifies a plurality of CTAs (M) to launch for each number of entries (N);
    determining that the number of entries stored in the first queue is equal to or greater than the number of entries (N) specified by the first parameter included in the work distribution parameters;
    in response to determining that the number of entries stored in the first queue is equal to or greater than the number of entries (N) specified by the first parameter, determining a number of CTAs to launch, wherein M CTAs are launched for each number of entries (N) stored in the first queue,
    launching the number of CTAs for execution by the streaming multiprocessor; and
    in response to executing the number of CTAs, updating a pointer to a next entry in the first queue to be processed by a next set of CTAs based on the work distribution parameters;
    determining an updated number of entries stored in the first queue; and
    based on determining the updated number of entries, adjusting the number of CTAs to launch based on the work distribution parameters and the updated number of entries.

2. The method of claim 1, further comprising:
    determining that a second number of entries stored in the first queue is less than the number of entries (N) specified by the first parameter;
    determining that a coalesce wait time has elapsed; and
    launching the next set of CTAs for execution by the streaming multiprocessor to process the second number of entries.

3. The method of claim 2, wherein a third parameter of the work distribution parameters specifies a step size that is used to update the pointer by adding the step size to the pointer and the third parameter is modified based on a partial step size operating mode when the next set of CTAs is launched.

4. The method of claim 2, further comprising storing the number of entries stored in the first queue in a special register when the next set of CTAs is launched.

5. The method of claim 1, further comprising:
    determining that a second number of entries stored in the first queue is less than the number of entries (N) specified by the first parameter;
    determining that a coalesce wait time has not elapsed; and
    waiting for additional entries in the first queue to be written with an additional portion of the work.

6. The method of claim 1, wherein the determining is also based on an alignment parameter that specifies a first amount of work previously launched in a first set of CTAs, and the alignment parameter is less than the first parameter.

7. The method of claim 1, wherein a third parameter of the work distribution parameters specifies a step size that is used to update the pointer by adding the step size to the pointer.

8. The method of claim 1, further comprising writing, by the number of CTAs, data to be processed by a second compute task to entries in a second queue associated with a second processing task.

9. The method of claim 1, wherein the entries stored in the first queue are produced during execution of a second compute task.

10. The method of claim 1, further comprising:
reading the entries stored in the first queue by the number of CTAs; and
updating a second pointer to the first entry in the first queue that is processed by the next set of CTAs.

11. The method of claim 1, further comprising determining that the number of entries causes the pointer to the first entry in the first queue to be aligned with a memory access boundary.

12. A non-transitory computer-readable storage medium storing instructions that, when executed by a processor, cause the processor to control the distribution of work for task processing, by performing the steps of:
determining a number of entries stored in a first queue, wherein the first queue is stored within a task metadata structure;
reading work distribution parameters encapsulated in the task metadata structure that define a first processing task, wherein a first parameter included in the work distribution parameters specifies a number of entries (N) needed to launch a set of compute thread arrays (CTAs) for execution by a streaming multiprocessor, and a second parameter included in the work distribution parameters specifies a plurality of CTAs (M) to launch for each number of entries (N);
determining that the number of entries stored in the first queue is equal to or greater than the number of entries (N) specified by the first parameter included in the work distribution parameters;
in response to determining that the number of entries stored in the first queue is equal to or greater than the number of entries (N) specified by the first parameter, determining a number of CTAs to launch, wherein M CTAs are launched for each number of entries (N) stored in the first queue,
launching the number of CTAs for execution by the streaming multiprocessor; and
in response to executing the number of CTAs, updating a pointer to a next entry in the first queue to be processed by a next set of CTAs based on the work distribution parameters;
determining an updated number of entries stored in the first queue; and
based on determining the updated number of entries, adjusting the number of CTAs to launch based on the work distribution parameters and the updated number of entries.

13. A system for controlling the distribution of work for task processing, the system comprising:

a memory that is configured to store a task metadata structure that defines a first processing task and includes a first queue; and
a task/work unit that is configured to:
determine a number of entries stored in the first queue;
read work distribution parameters encapsulated in the task metadata structure that define a first processing task, wherein a first parameter included in the work distribution parameters specifies a number of entries (N) needed to launch a set of compute thread arrays (CTAs) for execution by a streaming multiprocessor, and a second parameter included in the work distribution parameters specifies a plurality of CTAs (M) to launch for each number of entries (N);
determine that the number of entries stored in the first queue is equal to or greater than the number of entries (N) specified by the first parameter included in the work distribution parameters;
in response to determining that the number of entries stored in the first queue is equal to or greater than the number of entries (N) specified by the first parameter, determine a number of CTAs to launch, wherein M CTAs are launched for each number of entries (N) stored in the first queue,
launch the number of CTAs for execution by the streaming multiprocessor; and
in response to executing the number of CTAs, update a pointer to a next entry in the first queue to be processed by a next set of CTAs based on the work distribution parameters;
determine an updated number of entries stored in the first queue; and
based on determining the updated number of entries, adjust the number of CTAs to launch based on the work distribution parameters and the updated number of entries.

14. The system of claim 13, wherein the task/work unit is further configured to:
determine that a second number of entries stored in the first queue is less than the number of entries (N) specified by the first parameter;
determine that a coalesce wait time has elapsed; and
launch the next set of CTAs for execution by the streaming multiprocessor, to process the second number of entries.

15. The system of claim 13, wherein a third parameter of the work distribution parameters specifies a step size that is used to update the pointer by adding the step size to the pointer.

16. The system of claim 13, wherein the task/work unit is further configured to determine that the number of entries causes the pointer to the first entry in the first queue to be aligned with an access boundary of the memory.

17. The system of claim 13, wherein the task/work unit is configured to determine an integer number of sets of CTAs to launch by dividing the number of entries stored in the first queue by the number of entries (N) needed to launch each set of CTAs.

18. The system of claim 13, wherein each CTA included in the number of CTAs is launched as a single-instruction, multiple-thread (SIMT) group of threads, and at least a portion of threads included in the SIMT group of threads follow divergent execution paths.

* * * * *